June 15, 1943.  E. M. CUMMINGS  2,321,585
BATHROOM SCALE
Filed April 15, 1940  2 Sheets—Sheet 1
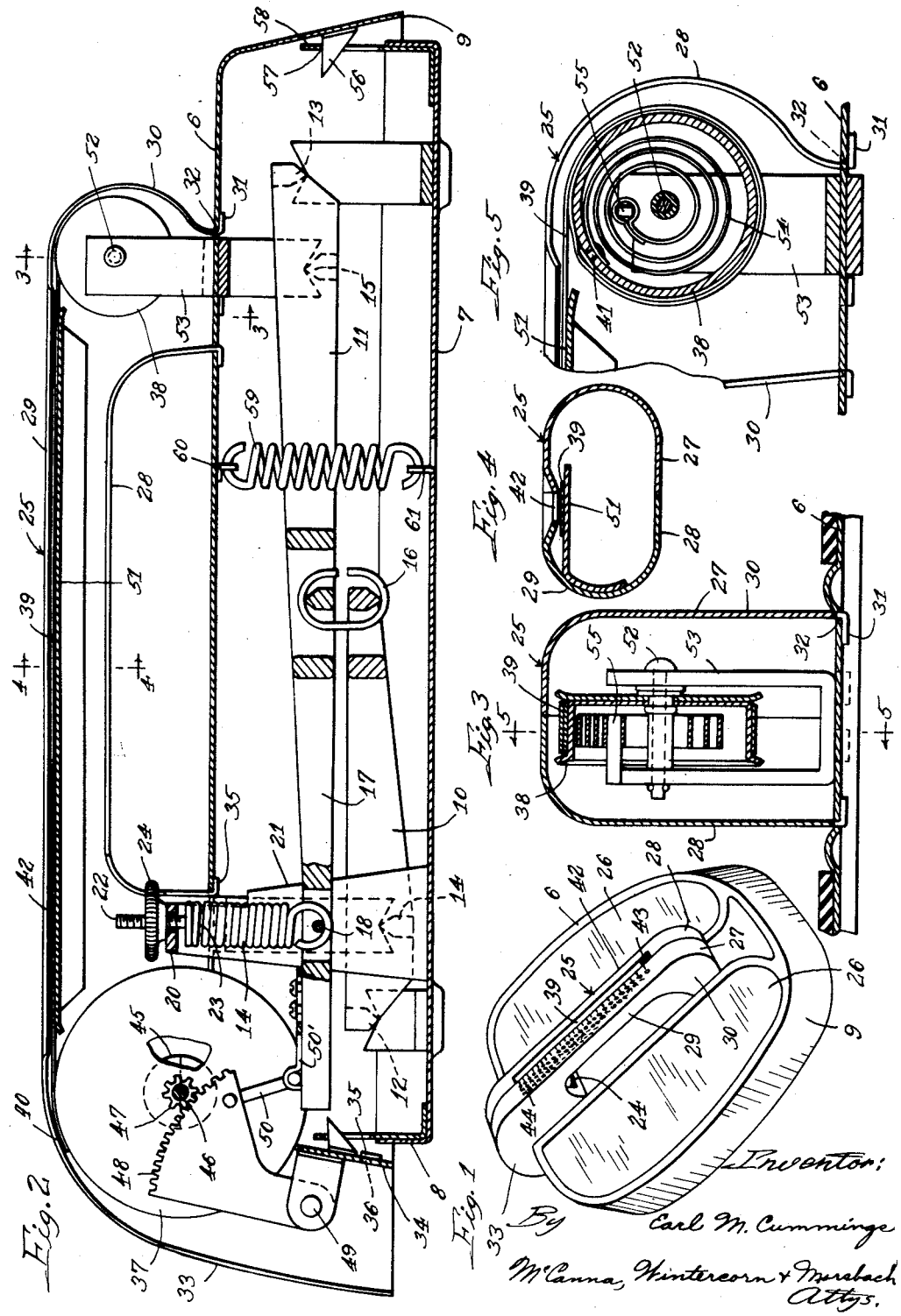

June 15, 1943.　　　E. M. CUMMINGS　　　2,321,585
BATHROOM SCALE
Filed April 15, 1940　　　2 Sheets-Sheet 2

Inventor:
Earl M. Cummings
By
McCanna, Wintercorn & Morsbach
Attys.

Patented June 15, 1943

2,321,585

UNITED STATES PATENT OFFICE 2,321,585

BATHROOM SCALE

Earl M. Cummings, Rockford, Ill.

Application April 15, 1940, Serial No. 329,757

8 Claims. (Cl. 265—63)

This invention relates to improvements in bathroom scales of a portable type.

An objection frequently voiced against bathroom scales is that they are not designed to be picked up readily and moved about. Where bathrooms are small, as in many apartments and smaller homes, the scale user does not have extra floor space to accommodate a scale regularly and must therefore keep the scale in any convenient place and get it out when it is to be used. Such users find present scales unhandy because they cannot be picked up and moved around easily. It is, therefore, the principal object of my invention to provide a bathroom scale of a neat and attractive design having a conveniently located handle for lifting and moving it.

Another object is to provide a lifting and carrying handle dividing the platform space longitudinally so as to present a pleasing symmetrical appearance, while at the same time affording a handle that is long enough to be gripped comfortably and also leaving ample foot room on both sides of the handle for handy use of the scale.

A further object is to provide a scale of the kind mentioned in which the handle is attached to the platform and spring means is provided for continuously urging the platform toward the base so that, upon lifting, the platform will not part from the base and the levers therebetween are kept under spring tension in a predetermined assembled relationship to the platform and base and other parts of the scale, and there is no clatter incident to the handling of the scale.

A further object of my invention is to provide a scale having a novel, easily readable weight-indicator that simulates the appearance of a well known type thermometer and is adapted to be read just as easily, the handle, in accordance with the present invention, being slotted longitudinally to reveal a movable tape moved in accordance with the load on the platform to indicate the weight on a graduated scale provided on the handle next to the slot.

Referring to the accompanying drawings:

Figure 1 is a perspective view of the scale;

Fig. 2 is a longitudinal vertical section of the scale with parts of the weight indicating mechanism shown in side elevation;

Fig. 3 is a cross-section on the line 3—3 of Fig. 2;

Fig. 4 is a cross-section on the line 4—4 of Fig. 2;

Fig. 5 is a longitudinal section of the rear portion of the handle, on an enlarged scale, showing the takeup drum and rewind spring therefor;

Similar reference numerals are applied to corresponding parts throughout the views.

Figure 6:
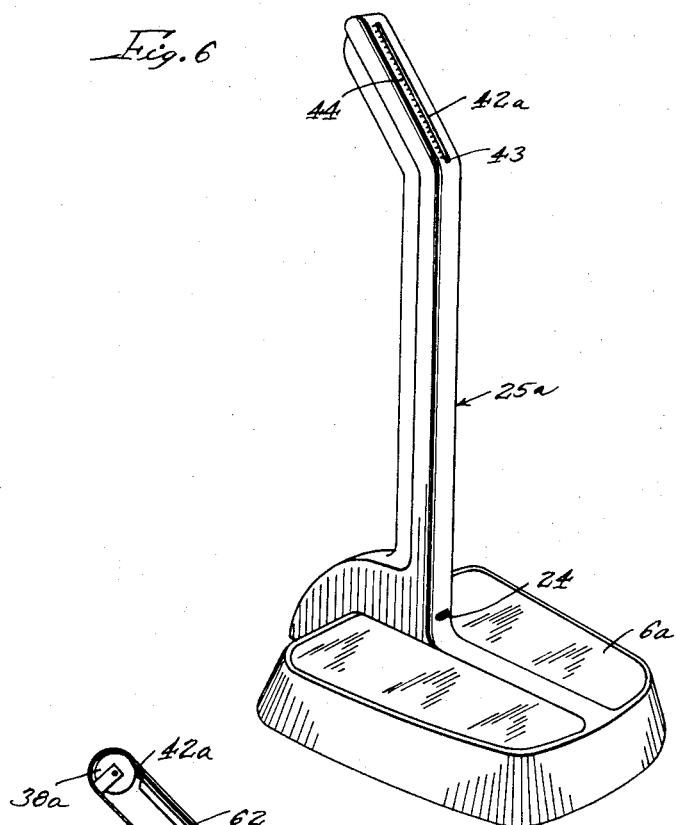
Fig. 6 is a perspective view of a pedestal type scale embodying a similar weight indicator tape.

The scale to which I have applied my invention comprises a platform 6 and base 7, both preferably of sheet metal construction, the base having an upturned marginal flange 8 and the platform having a downturned marginal flange 9, which serves to enclose the base so as to give a neat and attractive appearance. In so far as my invention is concerned, any suitable or preferred lever or weight transmitting means may be employed and any suitable spring or other counter-poising means. In the present instance, I have shown two wishbone levers 10 and 11 fulcrumed on the base, as indicated at 12 and 13 respectively, and providing other fulcrums 14 and 15 for support of the platform, the levers 10 and 11 being interconnected by a ring 16 in the conventional manner so that weight carried on the lever 10 results in a proportionate downward pull on the lever 11. The latter has a forwardly reaching arm 17 connected as at 18 to the lower end of a coiled tension spring 19 that is suitably suspended on the cross-portion 20 of an inverted U-shaped yoke 21 mounted on the base 7. A screw 22 suitably adjustably secured by a cross-head 23 in the upper end of the spring passes through a hole in the cross-portion 20 of the yoke 21 and has an adjusting nut 24 threaded thereon and bearing on top of the yoke, giving the usual zero adjustment for the scale. The cross-head 23 is, of course, threaded into the end of the spring to whatever extent is called for at the time the scale is assembled and tested. In other scales with which I am familiar, the arm 17 is further connected with weight indicating means of any one of a large variety of forms, such as a rotary dial or rotary drum arranged to be operated by means of a rack and pinion, where the rack is connected to move in response to the movement of the arm 17, while in still another form a stationary dial has a rotary pointer operated by a rack and pinion mechanism in a similar way. The rotary dial and drum type weight indicators have been incorporated in the scales in various ways, and the same is to some extent true of the other type of weight indicating means mentioned. However, it will soon appear that I have provided in connection with the improved lifting and carrying handle 25 an improved and novel weight indicating means having many important advantages over these other types.

Bathroom scales of the low type, that is those where the weight indicating dial or drum was housed either under the platform or in a housing extending only slightly above the level of the platform, and thus affording no handle grip whatsoever, have been notoriously awkward and unhandy to lift or move. This low type scale, as is well known, has to a very large extent superseded the high type despite that objection, mainly because of the neater appearance and compact form which permits storage of the scale in a small space where the high type scale would not fit, thus enabling the provision of a scale in many bathrooms where scales could not otherwise be used conveniently. The lifting and carrying handle 25 of my invention overcomes the objection mentioned and makes it easy to pick up and move the scale. This handle has been incorporated in such a way that it divides the scale platform 6 longitudinally into two treads or foot-receiving sections 26, thus locating the handle in a middle plane for good balance when the scale is lifted by means of the handle, while at the same time facilitating weighing and giving a pleasing symmetrical appearance, the arrangement moreover enabling provision of a handle that is long enough to be gripped comfortably. The handle is of hollow sheet metal construction so that it adds very little to the weight and cost of the scale, and while it may, of course, be constructed otherwise, as herein illustrated it is made in two halves 27 and 28 that are substantially counterparts, both being of generally channel-shaped cross-section, the two halves forming a tubular hand grip portion 29 extending the major portion of the length of the handle. The handle has one end 30 thereof suitably secured to the top wall of the platform 6 by means of lugs 31 provided on both halves of the handle entered through slots 32 provided therefor in the platform, the lugs being bent laterally after entry through the slots to secure the parts together, as indicated. The front end 33 of the handle is similarly secured by both halves to the front wall 34 and also to the top wall of the platform by means of other lugs 35 entered through slots 36 in said walls and bent laterally to secure the parts together.

The front and rear ends 33 and 30 of the handle form housings to enclose drums 37 and 38, while the intermediate handle grip portion 29 houses a weight indicating tape 39 that is attached at one end, as at 40, to the actuating drum 37 and has connection, as at 41, at the other end on the takeup or rewind drum 38. A longitudinal slot 42 in the one half 28 of the handle 25 exposes the tape 39 and the latter is painted, or in some other way given a contrasting appearance, from a certain point on to the rear end thereof as indicated at 43 in Fig. 1, so that when the tape 39 is moved forwardly by the actuating drum 37, this colored portion 43 is moved forwardly relative to the weight graduations 44 provided on the other half 27 of the handle 25 in longitudinally spaced relation with respect to and immediately alongside the slot 42 as clearly appears in Fig. 1, thus enabling a person to read his weight similarly as one reads an ordinary mercury type or other similar thermometer. Only the front end portion of the colored, herein blacked, portion 43 of the tape 39 is visible through the slot 42 in Fig. 1 at the zero point, and, of course, if a person weighing say 150 pounds stands on the scale, resting his feet on the two treads 26, he will find that the colored or blacked portion 43 of the tape is moved forwardly to a point alongside the 150 pound reading and there is no difficulty in reading the weight from a standing posture; it is only necessary to incline the head forwardly enough so that the line of sight is vertically downwardly toward the slot 42 through which the tape 39 is visible. In actual practice the tape 39 will have that portion colored black which is exposed through the slot 42 when there is nothing on the platform and only the end of the colored portion 43 will be visible, the portion 43 being preferably colored red for easiest visibility. The tape 39 is preferably of spring steel similar to that used for measuring tapes, such material being especially well suited for the present purposes because it coils easily and yet does not tend to buckle. The tape actuating drum 37 is suitably supported in bearings 45 in the front end portion 33 of the handle 25 on a shaft 46, which is rigid with the drum and has a pinion 47 fixed thereon and meshing with a gear sector 48 suitably pivotally supported as at 49 on the front wall 34 of the platform. The gear sector 48 is operated by the arm 17 of the wishbone lever 11 by means of a link 50 that is pivotally connected at its opposite ends to the gear sector and the arm, the latter connection including a bearing plate 50' that is preferably adjustable lengthwise relative to the arm so as to facilitate calibration of the scale at the factory. The tape 39 extends from the actuating drum 37 through the handle grip portion 29 of the handle 25 over a suitable guide 51 provided therefor inside the handle grip portion 29. The takeup or rewind drum 38 onto which the rear end portion of the tape 39 is wound, as shown in Figs. 3 and 5, is housed in the rear end portion 30 of the handle 25 and is supported for rotation on a shaft 52 mounted in a yoke 53 carried on the platform 6. A spiral spring 54 attached at its outer end as at 41 to the drum 38 has its inner end suitably attached to the yoke 53 as at 55.

Bathroom scales are commonly provided with means for loosely interconnecting the platform and base so that when the scale is lifted by means of the platform, the base is raised with it. The prongs shown at 56 on the inside of the marginal flange 9 of the platform are for that purpose and are shown entered freely in slots 57 in inwardly bendable sheet metal strap projections 58 secured to the base 7. However, it is well known what clatter accompanies the handling of a bathroom scale in that way and users are, therefore, cautioned to be careful in picking up a scale to lift it mainly by the base. With that thought in mind, it should be understood that I may, if desired, provide a handle like the handle 25 reaching through or around the platform and attached to the base, although, because of its simplicity, I prefer the construction shown. The objection to lifting the scale by means of its platform has fortunately been overcome by providing spring means for continuously urging the platform toward the base for the double purpose of keeping all of the fulcrums 12–15 in their proper positions and under light spring tension, and in addition enabling the scale to be lifted either by its base or its platform indiscriminately, the entire scale structure being tied together, as it were, by the spring means so that it can be handled easily as a unit. I have shown at 59 a coiled tension spring attached at 60 to the platform 6 and at 61 to the base 7, stretched between these two points of attachment to insure lifting the base 7 with the platform and keeping all of the fulcrums 12–15 seated under tension when the scale is lifted by means of the handle 25 and moved from one place to another. There is obviously nothing to cause any noise in the transportation of the scale by means of the handle 25 with the novel combination herein disclosed.

Figure 7:
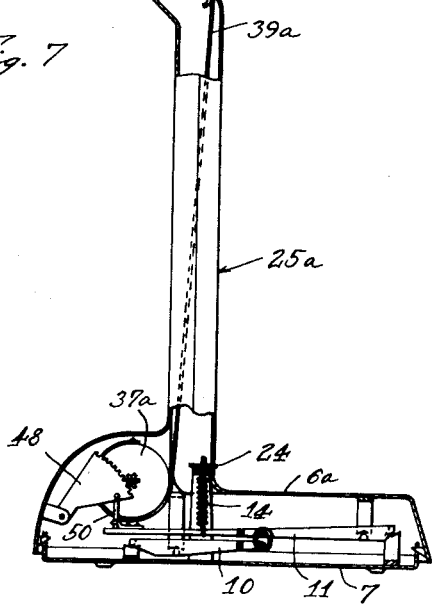
Fig. 7 is a side view of this scale indicating partly by dotted line showing and partly by section how the tape is operated.

In the scale shown in Figs. 6 and 7, a vertical pedestal extension 25a is provided on the platform 6a having a forwardly inclined upper end portion 62 with a longitudinal slot 42a therein, through which is exposed a certain length of weight indicator tape 39a. This tape, like the tape 39, is painted or in some other way given a contrasting appearance from a certain point on to the outer end thereof, as indicated in black at 43, so that when the tape is moved upwardly by the actuating drum 37a, this colored portion is moved upwardly relative to weight graduations 44 provided alongside the slot 42a, thus enabling a person to read his weight similarly as one reads an ordinary mercury type or other similar thermometer. Only the upper end portion of the colored, herein blacked, portion 43 of the tape 39a is visible through the slot 42a in Fig. 6 at the zero point, and, of course, if a person weighing say 150 lbs. stands on the scale, resting his feet on the two treads 26, he will find that the colored or blacked portion 43 of the tape is moved upwardly to a point alongside the 150 lb. reading and there is no difficulty whatsoever in reading the weight, inasmuch as the pedestal 25a brings the indicator at or above waist level. As previously described, the portion 43 is preferably colored red for easiest visibility, and the tape 39a is preferably of spring steel similar to that used for measuring tapes, the same tending to coil easily and have no tendency to buckle. The upper end of the tape 39a is wound on a takeup drum 38a mounted in the upper end of the pedestal 25a.

It is believed the foregoing description conveys a good understanding of the objects and advantages of my invention. The appended claims have been drawn to cover all legitimate modifications and adaptations.

I claim:

1. In a weighing scale having a movable platform member, a base member, and counterpoising means for resisting movement of said platform member under load, a tape movable in response to movement of the platform member under weight to indicate the weight on the platform member, a guide for said tape fixed in relation to one of said members having a longitudinal slot for exposing a portion of the length of the tape, calibrations on said guide indicating units of weight in relation to which an index point on the tape is arranged to move in the movement of the tape, a rotatable drum adjacent one end of said guide to which one end of the said tape is attached, said drum being carried on one of the aforesaid base and platform members, means for operating said drum in response to movement of said platform under load, a rotatable rewind drum adjacent the other end of the guide on which the other end of the tape is attached and wound, said rewind drum being carried on one of the aforesaid base and platform members, and spring means for continuously urging the latter drum to revolve in a direction so as to wind the tape thereon.

2. In a weighing scale, the combination of a base member, a platform member movably supported thereon, counterpoising means for said platform, a handle adapted for lifting and carrying the scale secured to one of said platform and base members and extending longitudinally over the platform so as to divide the platform space into two substantially equal area foot tread portions, a tape movable lengthwise of said handle in response to movement of said platform under weight to indicate the weight on the platform, a slot extending along the top of the handle exposing a portion of the tape, said handle having calibrations thereon indicating units of weight, and means to move the tape along the slotted handle distances proportional to the movement of said platform under load.

3. In a weighing scale, the combination of a base member, a platform member movably supported thereon, counterpoising means for said platform, a handle adapted for lifting and carrying the scale secured to one of said platform and base members and extending longitudinally over the platform so as to divide the platform space into two substantially equal area foot tread portions, a tape movable lengthwise of said handle in response to movement of said platform under weight to indicate the weight on the platform, a slot extending along the top of the handle exposing a portion of the tape, said handle having calibrations thereon indicating units of weight, a drum rotatably mounted in one end portion of the handle to which one end of the said tape is attached, means for turning said drum in response to movement of said platform under load, a rotatably mounted rewind drum in the opposite end of the said handle on which the other end of the tape is attached and wound, and spring means for continuously urging the rewind drum to turn in a direction to wind the tape thereon.

4. In a weighing scale, a base, levers fulcrumed thereon, a platform supported on said levers, means tying the platform and base together to prevent their separation, spring means resisting movement of the levers under weight imposed on the platform, a handle adapted for lifting and carrying the scale extending from the platform, and weight indicating means comprising a drum rotatably mounted on the platform, rack and pinion means for turning said drum operatively connected with said levers whereby the drum is turned in response to movement of the levers under weight imposed on the platform, and a relatively stiff but flexible tape windable on said drum and slidable in a guide on said handle, said tape indicating by its movement the weight placed on the platform.

5. In a weighing scale, a base, levers fulcrumed thereon, a platform supported on said levers, spring means resisting movement of the levers under weight imposed on the platform, and weight indicating means comprising a guide extending from said scale, a tape slidable in the guide and adapted to indicate by the movement thereof the weight placed upon the platform, and movement multiplication means connected on the one hand with the tape and on the other hand with the aforesaid levers whereby said tape is moved in response to movement of the levers when the platform is loaded.

6. In a weighing scale having a movable platform, a base, and counterpoising means for resisting movement of said platform under load, a tape movable in response to movement of the platform under weight to indicate the weight on the platform, a guide for said tape rigid with the platform, and projecting upwardly from said platform having a longitudinal slot therein for exposing a portion of the length of said tape, calibrations on said guide indicating units of weight in relation to which an index mark on the tape is arranged to move in the movement of the tape, and means to move the tape along the guide distances proportional to movement of the platform under load.

7. In a weighing scale having a movable platform, a base, and counterpoising means for resisting movement of said platform under load, a tape movable in response to movement of the platform under weight to indicate the weight on the platform, a guide for said tape rigid with and projecting upwardly from said platform having a longitudinal slot therein for exposing a portion of the length of said tape, calibrations on said guide indicating units of weight in relation to which an index mark on the tape is arranged to move in the movement of the tape, an actuating drum attached to one end of the tape and disposed in one end of said guide, a spring actuated takeup drum attached to the other end of said drum and disposed in the other end of said guide, and means for turning said actuating drum in proportion to movement of the platform under load.

8. In a weighing scale, a base, a platform movably supported thereon, counterpoising means for said platform, means preventing the platform from being lifted off the base, a hollow handle adapted for lifting and carrying the scale rigid with the platform and extending longitudinally with respect thereto so as to divide the platform into two substantially equal foot tread portions, the mass of said scale being in substantially symmetrical relation to said handle, and a tape weight indicating means housed in and guided by said handle and visible through an opening provided in the wall of said handle, said weight indicating means being operatively connected so as to be movable in the movement of said platform relative to said base in the loading of the platform.

EARL M. CUMMINGS.